United States Patent [19]

Korenberg

[11] Patent Number: 5,285,628
[45] Date of Patent: Feb. 15, 1994

[54] METHOD OF COMBUSTION AND COMBUSTION APPARATUS TO MINIMIZE $NO_x$ AND CO EMISSIONS FROM A GAS TURBINE

[75] Inventor: Jacob Korenberg, York, Pa.
[73] Assignee: Donlee Technologies, Inc., York, Pa.
[21] Appl. No.: 664,288
[22] Filed: Jan. 18, 1990
[51] Int. Cl.⁵ .................................. F02G 3/00
[52] U.S. Cl. ...................... 60/39.05; 60/39.55; 60/732; 60/738; 60/748; 60/752
[58] Field of Search ............ 60/39.05, 39.55, 732, 60/738, 752, 748

[56] References Cited

U.S. PATENT DOCUMENTS

| | | | |
|---|---|---|---|
| 3,359,723 | 12/1967 | Bohensky et al. | 60/39.05 |
| 3,859,786 | 1/1975 | Azelborn et al. | 60/748 |
| 4,102,125 | 7/1978 | Schlep | 60/39.53 |
| 4,173,118 | 11/1979 | Kawaguchi | 60/748 |
| 4,201,047 | 5/1980 | Warren et al. | 60/755 |
| 4,214,435 | 7/1980 | Campbell | 60/39.05 |
| 4,382,771 | 5/1983 | Carr | 60/39.55 |
| 4,688,521 | 8/1987 | Korenberg | 122/4 D |
| 4,787,208 | 11/1988 | DeCorso | 60/732 |
| 4,819,438 | 4/1989 | Schultz | 60/732 |
| 4,830,604 | 5/1989 | Korenberg | 431/158 |
| 4,860,695 | 8/1989 | Korenberg | 122/136 R |
| 4,879,959 | 11/1989 | Korenberg | 110/264 |
| 4,920,925 | 5/1990 | Korenberg et al. | 122/149 |
| 4,989,549 | 2/1991 | Korenberg | 122/149 |
| 5,002,483 | 3/1991 | Becker | 60/39.55 |
| 5,029,557 | 7/1991 | Korenberg | 122/149 |

Primary Examiner—Richard A. Bertsch
Assistant Examiner—Howard R. Richman
Attorney, Agent, or Firm—Finnegan, Henderson, Farabow, Garrett & Dunner

[57] ABSTRACT

A staged combustion apparatus for a gas turbine to lower the concentration of $NO_x$ and CO in the exhaust gases. Combustion occurs in a first and second stage, the first stage being sub-stoichiometric combustion and the second stage being above-stoichiometric combustion. Cyclonic combustion occurs in one of the first and second combustion stages and a swirling pattern of combustion occurs in the other of the combustion stages. Steam injection is provided to further lower the concentration of $NO_x$ in the exhaust emissions from the gas turbine.

22 Claims, 5 Drawing Sheets

METHOD OF COMBUSTION AND COMBUSTION APPARATUS TO MINIMIZE NO$_x$ AND CO EMISSIONS FROM A GAS TURBINE

BACKGROUND OF THE INVENTION

1. Field of the Invention

The present invention relates to a combustion apparatus, and more particularly to a combustion apparatus for a gas turbine that utilizes swirling and cyclonic staged combustion to minimize the formation of NO$_x$ and CO.

2. Description of the Related Art

Figure 1:
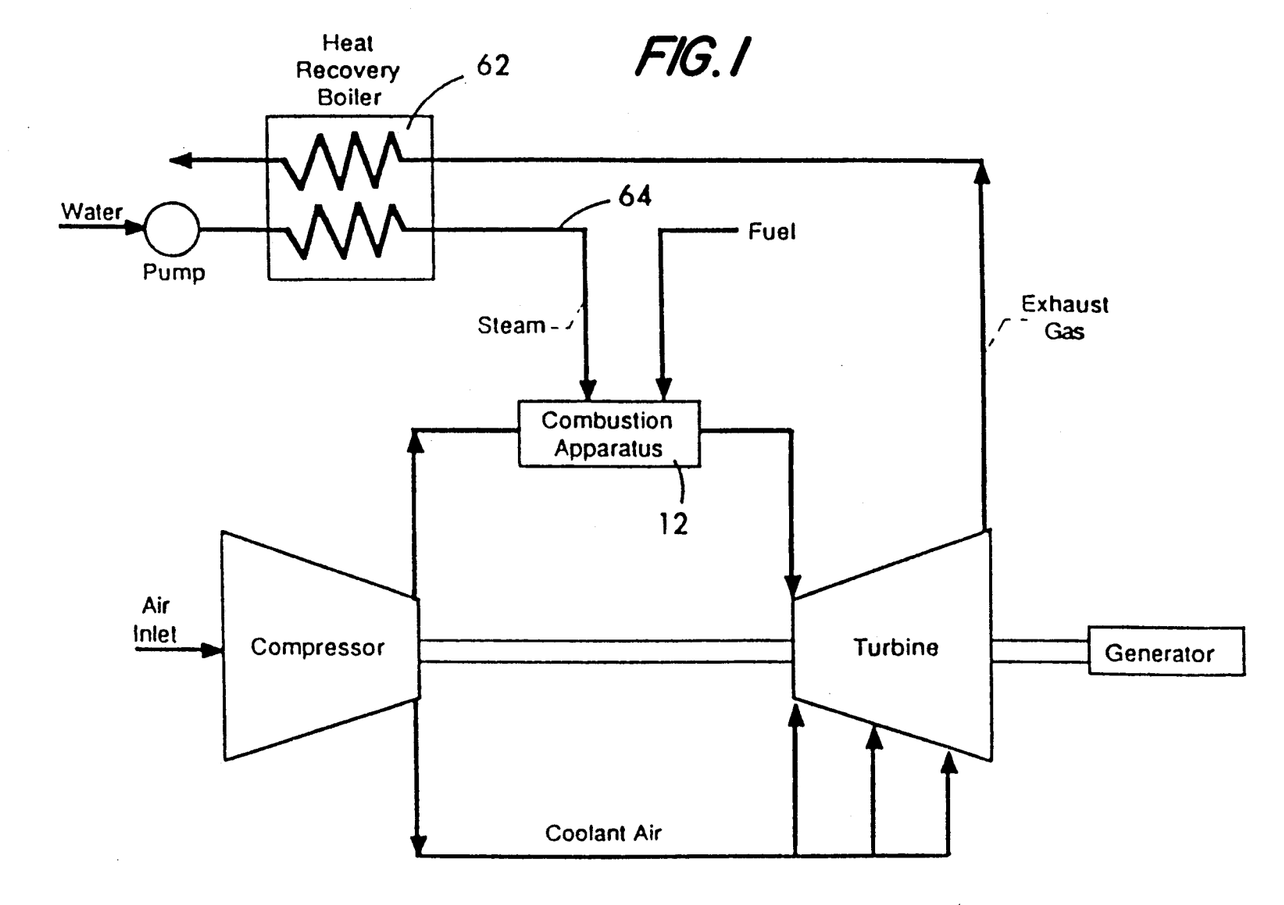
FIG. 1 is a schematic diagram of a conventional steam injected gas turbine cycle.

The conventional steam-injected gas turbine cycle is shown schematically in FIG. 1. In such a system, the ambient air is pressurized in a compressor, heated in a combustor by burning of fuel, and expanded in the turbine. The turbine drives an air compressor and an electrical generator. The heat in the turbine exhaust is utilized to raise the relatively low pressure steam in a heat recovery steam generator and the steam is subsequently injected into the combustor. Steam injection is known to increase the power output and efficiency of the turbine by increasing the mass flow through the turbine relative to the compressor while decreasing the power required to drive the compressor.

The steam injected gas turbine cycle has shown good performance in sizes ranging from 500 kw industrial applications to relatively large utility plants of about 50 Mw and higher. In many instances, the steam injected gas turbine cycle is preferable to a conventional combined gas turbine/steam turbine cycle because it has a capital cost that is up to 20% less than that of a comparable capacity combined cycle power plant. This savings in capital costs occurs because the steam injected gas turbine cycle does not require a separate steam turbine or an associated heat rejection system.

Most industrial applications (500 kw-5 Mw) require only a small fraction of the power generating capacity of the typical utility power plant. However, few industries can generate electricity as economically as utilities because they cannot take advantage of economies of scale and higher steam parameters. There are many industrial applications, however, where both heat and electricity can be generated (cogeneration) on site at higher overall efficiency than when power and heat are generated separately. The steam injected gas turbine cycle is generally preferred for these relatively small industrial applications. This is because the expansion efficiency of steam turbines decreases with decreasing power levels and steam parameters, while the expansion efficiency of gas turbines is less dependent on power level. The steam injected gas turbine cycle is also more attractive for these low power level applications because it does not include a separate steam turbine or associated heat injection system that result in significantly higher capital investment.

In the past several years, there has been a boom of relatively small scale (less than 5 Mw) cogeneration plants in populated areas such as California. Many of these plants utilize natural gas fired combustion with steam injection to augment power production. These relatively compact, modular units can provide electrical efficiencies near 40 percent and higher when burning natural gas. However, due to the proximity of highly populated areas, these industrial plants face some of the strictest emission standards in the world. Meeting these standards has become one of the greatest challenges to the present day gas turbine combustion technology.

Gas turbine emissions include NO$_x$, CO and unburned hydrocarbons. Recently, gas turbine vendors have developed staged combustors in an attempt to limit NO$_x$ emissions. For example, U.S. Pat. No. 4,102,125 discloses a primary and secondary combustion chamber with gasification of the fuel occurring in the first chamber. However, this patent discloses a premixing chamber, a first mixing chamber, and second mixing chamber disposed before the primary combustion chamber. The complicated structure of this combustor makes it difficult to manufacture and operate.

As disclosed in U.S. Pat. No. 4,214,435, another technique for reducing NO$_x$ emissions is injecting steam into the combustor. Adding steam to the combustion zone lowers the flame and gas temperature and suppresses NO$_x$ formation.

Although staged combustion and steam injection can yield a reduction in NO$_x$ emissions, even further reductions are required in certain areas. For example, in some areas of the United States, gas turbine cogeneration plants must meet emission standards as low as 9 ppm at 15 percent O$_2$. In these areas where staged combustion and steam injection cannot meet pollution requirements, the only option available is utilization of a selective catalytic reduction unit downstream of the gas turbine. However, this selective catalytic reduction unit has limited application in the small capacity range because of its significant capital cost. Moreover, experience with selective catalytic reduction units in cogeneration plants employing gas turbines has been reported as less than favorable. Therefore, there is a need for an ultra-low NO$_x$ natural gas fired combustor for a steam injected gas turbine cycle that eliminates the need for a catalytic reduction unit.

In addition to being used in steam injected gas turbine cycles, gas turbines are utilized in combined cycle applications with a steam turbine. Topping combustors for a gas turbine in a combined cycle application are typically a multiple "can-type" arrangement utilizing air-cooled metallic liners. Due to geometric considerations, these topping combustors often lack the ability to provide a wide turndown range and to allow easy staging of air. Also, a significant steam injection rate reduces overall combined cycle efficiency. Thus, topping combustors used in combined cycle applications result in relatively high NO$_x$ emissions that often require a selective catalytic reduction unit. Therefore, there is a need for an ultra-low NO$_x$ topping combustor for a gas turbine used in a combined cycle.

SUMMARY OF THE INVENTION

The present invention overcomes the problems and disadvantages of the prior art by providing a combustion apparatus for a gas turbine that decreases the concentration of NO$_x$ and CO in the exhaust gases.

One object of the present invention is to provide a combustion apparatus that can be retrofitted into existing steam injected gas turbine cycles and combined cycles for reducing the concentration of NO$_x$ and CO emitted therefrom.

It is another object of the present invention to provide a combustion apparatus that reduces the overall capital cost of a steam injected gas turbine system.

It is yet another object of the present invention to produce a combustion apparatus for a gas turbine that will yield emissions that can meet the strictest emission standards without the need for expensive auxiliary reduction equipment downstream of the combustor or gas turbine.

It is still another object of the present invention to provide a gas turbine that results in higher plant efficiency in comparison with prior art systems.

Additional objects and advantages of the invention will be set forth in the description which follows, and in part will be apparent from the description, or may be learned by practice of the invention. The objects and advantages of the invention may be realized and obtained by means of the instrumentalities and combinations particularly pointed out in the appended claims. To achieve the foregoing objects in accordance with the invention as embodied and broadly described herein, there is provided a combustion apparatus for a gas turbine to minimize the formation of $NO_x$ and CO. The apparatus comprises an elongated combustion vessel having along its axial length a first combustion portion and a second combustion portion for sub-stoichiometric and above-stoichiometric combustion, respectively. The first and second combustion portions are in communication and the combustion vessel includes a substantially cylindrical wall. Means are provided for supplying fuel into the first portion of the combustion vessel. Means are also provided for supplying a first stream of pressurized air into the first portion of the combustion vessel in an amount sufficient to form a fuel-rich ratio for sub-stoichiometric combustion within the first portion of the combustion vessel. There is further provided means for tangentially supplying a second stream of pressurized air into the second portion of the combustion vessel to mix with the sub-stoichiometric combustion product gases for above-stoichiometric combustion in the second combustion portion. Additionally, means are provided for forming a cyclonic flow pattern of combustion within one of the first and second combustion portions of the combustion vessel and means are further provided for forming a swirling pattern of combustion in the other of the first and second combustion portions of the vessel. Also, means for supplying pressurized steam into the combustion vessel to reduce the formation of $NO_x$ are provided.

In another aspect of the present invention, there is provided a method of combustion for minimizing $NO_x$ and CO emissions in a gas turbine. The method includes tangentially supplying a first stream of pressurized air into the first portion of a combustion vessel in an amount sufficient for sub-stoichiometric combustion therein. Fuel is supplied in that first portion in a fuel-rich ratio. The sub-stoichiometric combustion product gases from the first portion of the combustion vessel are transported to the second portion of the combustion vessel, the first and second portions being separated by a gas swirler for increasing the swirling intensity of the gases entering the second portion. A second stream of pressurized air is tangentially supplied into the second portion of the combustion vessel in an amount sufficient for above-stoichiometric combustion of the gases entering the second combustion portion. A cyclonic flow pattern of hot gases is created within one of the first and second combustion portions of the combustion vessel and a swirling pattern of combustion is created in the other of the first and second combustion portions. Pressurized steam is supplied into the combustion vessel to minimize $NO_x$ emissions. Finally, the above-stoichiometric combustion product gases are transported out of the second portion of the combustion vessel to a gas turbine.

It is to be understood that both the foregoing general description and the following detailed description are exemplary and explanatory only and are not restrictive of the invention as claimed.

The accompanying drawings, which are incorporated in and constitute a part the specification, illustrate a preferred embodiment of the invention and, together with the general description given above and the detailed description of the preferred embodiment given below, serve to explain the principles of the invention.

DESCRIPTION OF THE PREFERRED EMBODIMENTS

Reference will now be made in detail to the present preferred embodiments of the invention as illustrated in the accompanying drawings. It should be understood that the combustion apparatus of the present invention can be utilized in the industrial gas turbine market for generating electricity or electricity and steam (cogeneration). It should also be understood that the combustion apparatus of the present invention can be utilized as a topping combustor in a combined cycle and as the combustor in a stream injected gas turbine cycle.

A potential application of a steam injected gas turbine cycle incorporating the present invention is the production of electricity and hot flue gases for process heat requirements. Presently, there is a concern for using direct flue gas heating due to the reaction of $NO_x$ with the materials being heated. The relatively "$NO_x$-less" combustion apparatus of the present invention alleviates this concern, thereby enabling direct heating by flue gases. Such a system would eliminate the capital costs associated with indirect heating. Thus, there are many practical uses or a combustion apparatus incorporating the teachings of the present invention.

Figure 2:
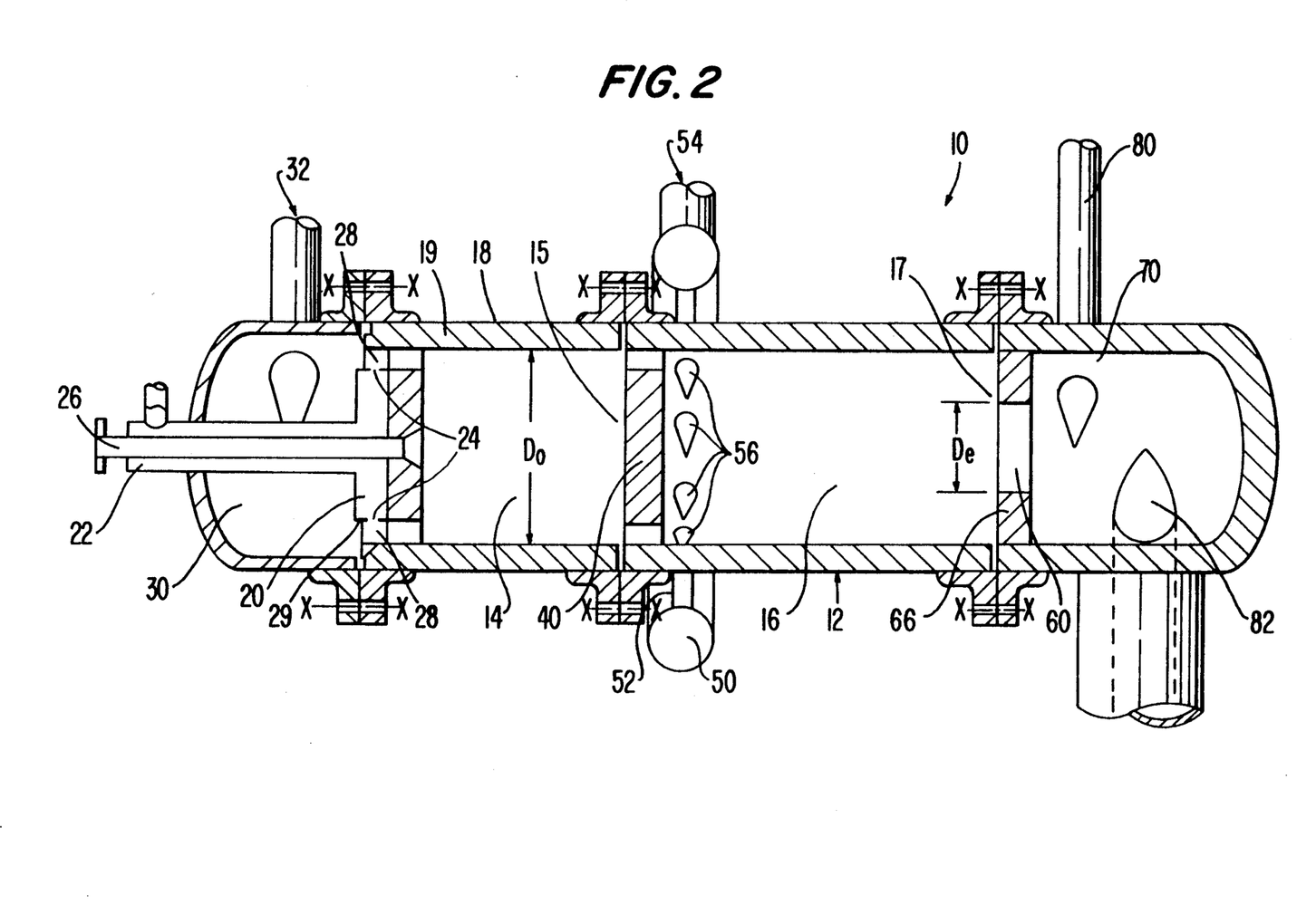
FIG. 2 is a side elevational view in cross section of a first embodiment of a combustion apparatus incorporating the teachings of the present invention.
Figure 6:
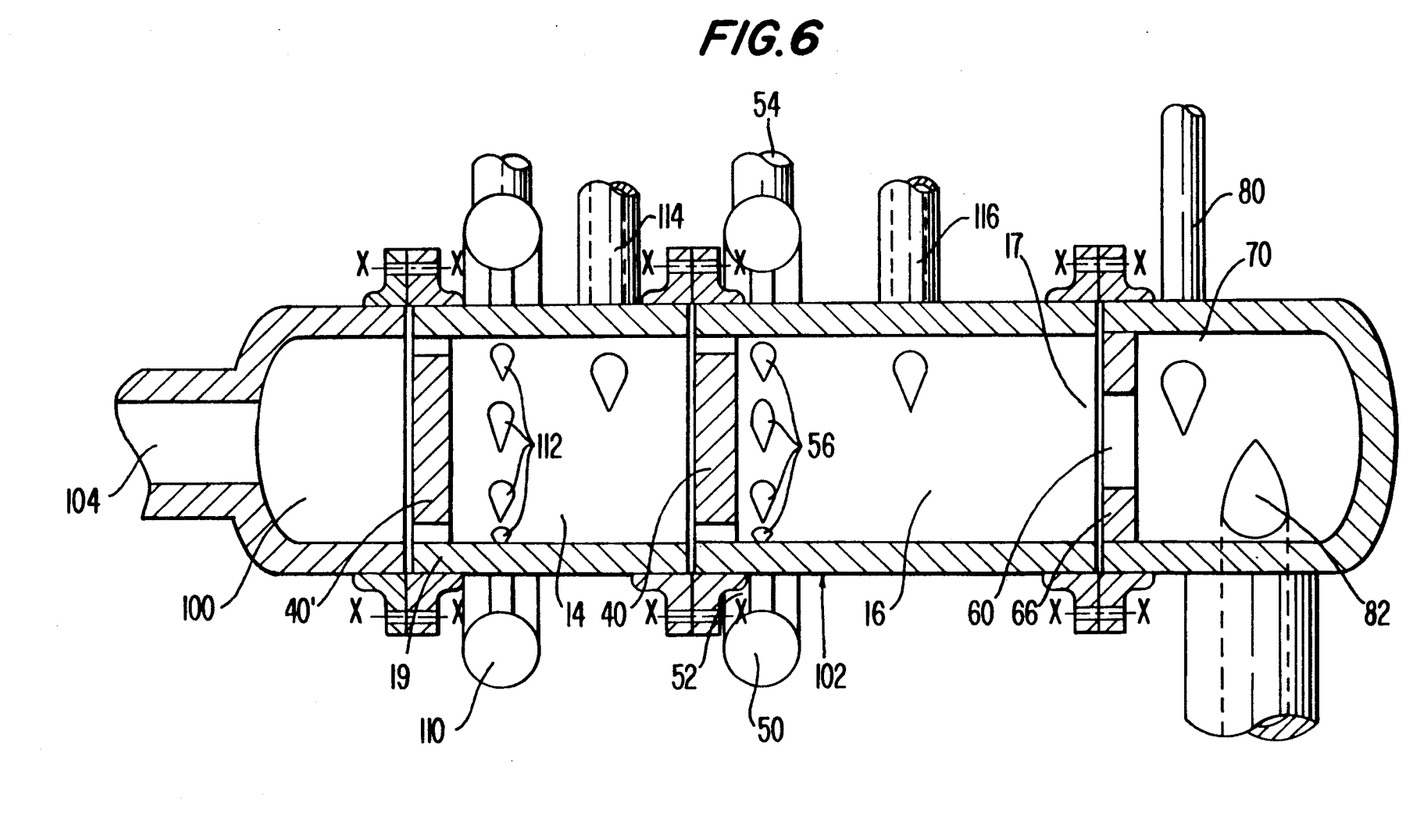
FIG. 6 is a side elevational view in cross section of a second embodiment of a combustion apparatus incorporating the teachings of the present invention.

Two embodiments of a gas turbine combustor made in accordance with the present invention are illustrated in the accompanying drawings. FIG. 2 illustrates a combustor for a steam injected gas turbine cycle and FIG. 6 illustrates a topping combustor for a combined cycle. The same reference numerals will be used in FIGS. 2 and 6 to identify identical components of these embodiments.

In accordance with the present invention, there is provided a combustion apparatus including an elongated combustion vessel having along its axial length a first and second combustion portion for sub-stoichiometric and above-stoichiometric combustion, respectively, the first and second combustion portions being in communication and the combustion vessel including a substantially cylindrical wall. As embodied herein and as shown in FIGS. 2 and 6, combustion apparatus 10 includes an elongated combustion vessel 12 having along its axial length a first combustion portion and a second combustion portion 14 and 16, respectively, for sub-stoichiometric and above-stoichiometric combustion, respectively. First combustion portion 14 and second combustion portion 16 are in communication and combustion vessel 12 includes substantially cylindrical wall 18. Cylindrical wall 18 is preferably lined with refractory material 19. Combustion vessel 12 is a pressurized combustor typically having a pressure of about 4 atmospheres to about 25 atmospheres.

In accordance with the present invention, the combustion apparatus includes means for supplying fuel into the first portion of the combustion vessel. As embodied in the first embodiment and as shown in FIG. 2, the means for supplying fuel into first portion 14 of combustion vessel 12 includes gaseous fuel plenum chamber 20, gaseous fuel inlet pipe 22 and a plurality of radially spaced gas distribution holes 24. Gaseous fuel plenum chamber 20 is provided on front portion 14 of combustion vessel 12 and includes an outer surface 29. An annular air supply opening 28 is formed between outside surface 29 of gaseous fuel plenum chamber 20 and refractory material 19 that lines cylindrical wall 18. Gaseous fuel inlet pipe 22 communicates with fuel plenum chamber 20 for supplying plenum chamber 20 with, for instance, natural gas. Gas distribution holes 24 communicate with and supply natural gas via annular air supply opening 28 into first combustion portion 14.

In addition to being capable of burning natural gas supplied through gaseous fuel inlet pipe 22, the combustion apparatus of the present invention is capable of efficiently combustioning fuel oil. When fuel oil is combusted, it is supplied to first combustion portion 14 directly through fuel oil inlet pipe 26. Before the fuel oil is injected into the combustion chamber it must be properly atomized to provide for complete smokeless combustion. Appropriate methods for atomizing fuel oil are well known to those skilled in the combustion art. Such methods include the use of state-of-the-art nozzle designs and utilizing high oil pressures (up to 400 psig).

Figure 5A:
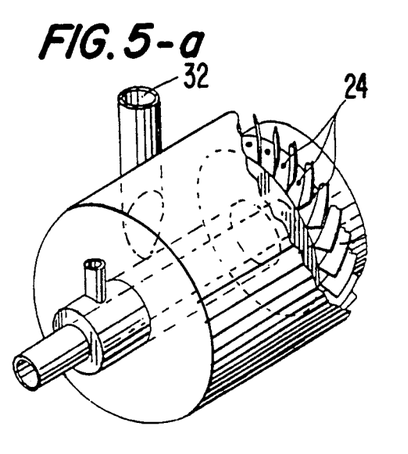
FIG. 5(a) is a broken away view in perspective of the front end of the combustion apparatus illustrated in FIG. 2.
Figures 5B, 5C:
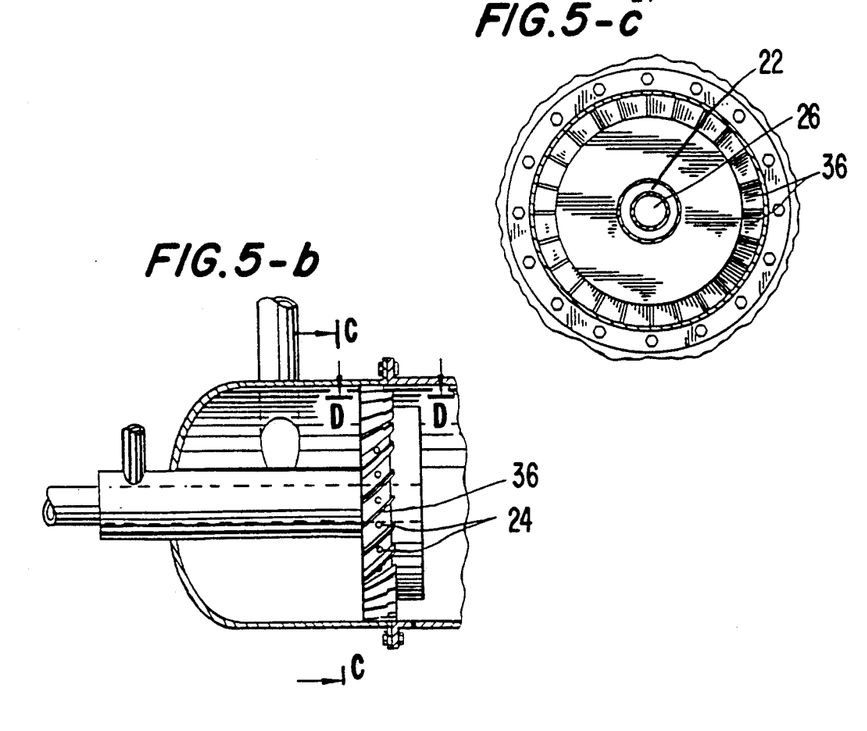
FIG. 5(b) is a side elevational view of the front end of the combustion apparatus shown in FIG. 5(a)
FIG. 5(c) is a cross-sectional view taken along the line C—C of FIG. 5(b)

In accordance with the present invention, the combustion apparatus includes means for supplying a first stream of pressurized air into the first portion of the combustion vessel in an amount sufficient to form a fuel-rich ratio for sub-stoichiometric combustion within the first portion of the combustion vessel. As embodied in the first embodiment and as shown in FIG. 2, the means for supplying air into first portion 14 of combustion vessel 12 includes primary plenum chamber 30. As shown in FIG. 5(b), primary plenum chamber 30 has an air inlet 32 and an opening in communication with annular air supply opening 28. Air entering primary plenum chamber 30 from air inlet 32 mixes in annular air supply opening 28 with natural gas supplied through gas distribution holes 24. In the first embodiment of the present invention, the combustion temperature is preferably maintained at less than about 2000° F. in the first combustion portion. A temperature in the range of about 1400° F.–2000° F. will provide, under appropriate circumstances, stable combustion with virtually no NO$_x$ emissions. Such a low temperature and reducing atmosphere provide only a trace of NO$_x$ emissions. The combustion in combustion portion 14 provides sufficient heat to heat all combustible gases to a temperature which provides extremely low NO$_x$ emissions, but supports stable combustion. Typically, the primary air in combustion portion 14 will be approximately in the 40%–70% range of the amount necessary for stoichiometric combustion, depending upon combustible gas temperature and its calorific value.

Figure 5D:
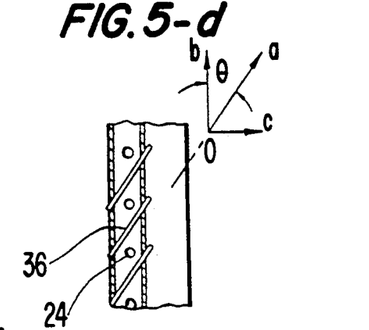
FIG. 5(d) is a partial cross-sectional view taken along the line D—D of FIG. 5(b)

Preferably, annular air supply opening 28 includes a plurality of radially spaced vanes 36 tilted at a selected angle $\theta$ from the axis of first combustion portion 14 as is best shown in FIGS. 5(b) and (d). Decreasing the selected angle between the vanes 36 and the normal axis of first combustion portion 14 has the effect of increasing the angular velocity, at a given cross-sectional area and air flow, of air entering first combustion portion 14 through annular air supply opening 28. Angle $\theta$ is preferably in the range of about 20° C. to about 60° C. Air entering first combustion portion 14 has a swirling pattern due to the selected angle $\theta$ of vanes 36 for generating swirling air in first combustion portion 14. As can best be seen in FIGS. 5(a), (b) and (d), the plurality of gas distribution holes 24 are located between vanes 36. The location of gas distribution holes 24 between vanes 36 results in low CO emissions.

Figure 4:
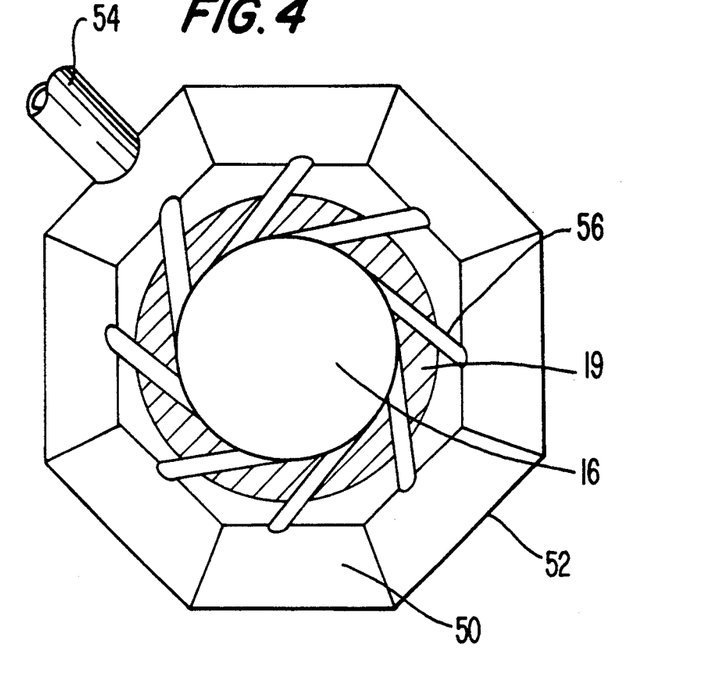
FIG. 4 is a cross-sectional view through the secondary plenum chamber of FIGS. 2 and 6.

In accordance with the present invention, the combustion apparatus includes means for tangentially supplying a second stream of pressurized air into the second portion of the combustion vessel to mix with the sub-stoichiometric combustion product gases for above-stoichiometric combustion in the second combustion portion. As embodied herein and as shown in FIGS. 2 and 4, the means for supplying air into second portion 16 of combustion vessel 12 includes secondary plenum chamber 50 fixed to and surrounding second portion 16 of combustion vessel 12. Secondary plenum chamber 50 includes a metal shell 52, an air inlet 54 and a plurality of radially spaced secondary tangential air nozzles 56 communicating with second portion 16 of combustion vessel 12. The sub-stoichiometric combustion product gases entering second combustion portion 16 include primarily CO and H$_2$, with some amounts of N$_2$, H$_2$0, and C0$_2$. In the first embodiment of the present invention, the combustion temperature in second combustion portion 16 is preferably maintained at less than about 2000° F.

Figure 3:
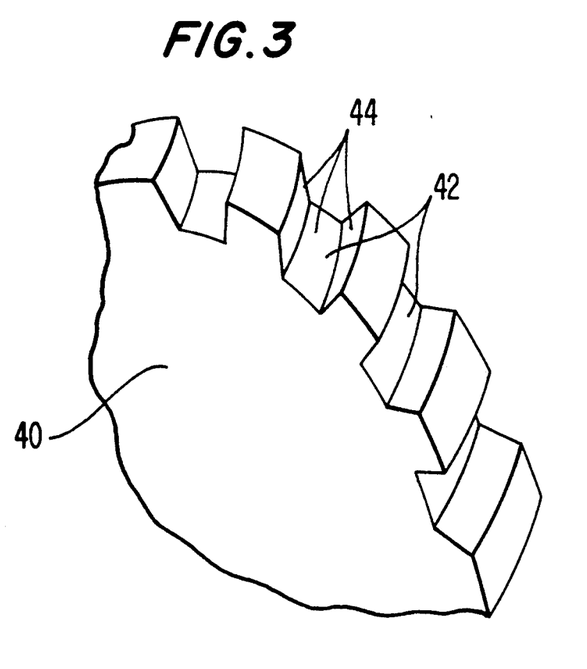
FIG. 3 is a broken away view in perspective of the gas swirler utilized in the combustion apparatus of the present invention.

Preferably, combustion apparatus 10 includes a combustion gas swirler 40 disposed adjacent the rear end 15 of first combustion portion 14 for directing the swirling hot combustion gases out of first combustion portion 14 in a direction substantially tangential to cylindrical combustion chamber wall 18. In effect, swirler 40 separates first combustion portion 14 and second combustion portion 16. The structure of swirler 40 is shown in FIG. 3 and is fully disclosed in U.S. patent application Ser. No. 118,933, filed Nov. 10, 1987 and assigned to a common assignee, which is incorporated herein by reference. As shown in FIG. 3, gas swirler 40 comprises a plurality of radially spaced slots 42 and is preferably formed of a refractory material Each slot 42 has three refractory walls 44. Refractory material 19 lining cylindrical wall 18 engages the outer surface of swirler 40 and with the walls 44 forms the slots 42. Swirler 40 intensifies the swirling flow in second combustion portion 16 providing an increased gas mixing which provides even temperature in second combustion portion 16 and results in decreased $NO_x$ emissions. Due to the high gas velocity in the slots 42 of gas swirler 40, there is a high turbulence and mixing between combustible gases and secondary air tangentially introduced through air nozzles 56. Accordingly, an even temperature distribution in second combustion portion 16 results. This relatively low and evenly distributed combustion temperature results in decreased $NO_x$ emissions.

As shown in FIGS. 2 and 6, second combustion portion 16 also includes an exit throat 60 disposed in a spaced relation from gas swirler 40 at a rear end 17 of second combustion portion 16. Exit throat 60 has a diameter less than the diameter of the inner surface of cylindrical wall 18. The ratio of the diameter of exit throat 60 ($D_e$) to the diameter of the inner surface of wall 18 of vessel 12 ($D_o$), i.e., $D_e/D_o$, is preferably within the range of about 0.4 to about 0.7. Rear end wall 66 that forms exit throat 60 is preferably comprised of a refractory material.

In accordance with the present invention, the combustion apparatus includes means for forming a cyclonic flow pattern of combustion within one of the first and second combustion portions of the combustion vessel. As embodied herein, combustion apparatus 10 includes reduced diameter exit throat 60 for forming a cyclonic flow pattern of hot gases within second combustion portion 16 of combustion vessel 12. Preferably, the means for supplying the second stream of pressurized air, gas swirler 40, and reduced diameter exit throat 60 are dimensioned and configured to effect a cyclonic flow pattern having a Swirl number of at least 0.6 and a Reynolds number of at least 18,000. It is well known in the art how to construct a combustion vessel for cyclonic combustion. The major cyclone combustion geometrical characteristics such as inside diameter ($D_o$), length (L) and exit diameter ($D_e$) should be designed properly to achieve acceptable cyclone performance based on established cyclone criteria of a Swirl number of at least 0.6 and Reynolds number of at least 18,000. These minimum values should be sufficient to provide gas recirculation inside second combustion portion 16, good fuel and air mixing and stable combustion. Second portion 16 will, during operation, exhibit large internal reverse flow zones with as many as three concentric torodial recirculation zones being formed.

In accordance with the present invention, the combustion apparatus include means for forming a swirling pattern of combustion in the other of the first and second combustion portions of the combustion vessel. As embodied in the first embodiment and as shown in FIG. 2, combustion apparatus 10 includes annular air supply opening 28 and vanes 36 for forming a swirling pattern of combustion in first combustion portion 14 of combustion vessel 12.

In accordance with the present invention, the combustion apparatus includes means for supplying pressurized steam into the combustion vessel to reduce the formation of $NO_x$. As embodied herein and as shown schematically in FIG. 1, pressurized steam is supplied from heat recovery boiler through steam line 64 to combustion vessel 12. In a cogeneration situation, a portion of the steam produced in the heat recovery boiler will be used for process needs. The injection of steam also helps to reduce the combustion temperature.

In the embodiment shown in FIG. 2, steam is supplied into first combustion portion 14 and second combustion portion 16 via primary plenum chamber 30 and secondary plenum chamber 50, respectively. It is contemplated that steam can be supplied directly to combustion vessel 12 and into only one of the two combustion portions.

As embodied herein and as shown in FIGS. 2 and 6, combustion vessel 12 further comprises an exhaust chamber 70 extending rearwardly of second combustion portion 16 for cooling the exhaust gases exiting from the second portion. Means are provided for supplying a third stream of air into exhaust chamber 70 to lower the temperature of the exhaust gases. As embodied herein, a tertiary inlet nozzle 80 supplies the third stream of air into exhaust chamber 70. The combustion gases then exit tangentially from exhaust chamber 70 through exhaust nozzle 82 and are directed to a gas turbine for expansion to drive an electrical generator.

For a turbine inlet temperature of 1600° F. and air compressor ratio of 15, the overall air supplied to the combustor (primary, secondary and tertiary) is about 330%. This excess air will generate work in the gas turbine. For the gas turbine cycle depicted in FIG. 1, the amount of steam injected into the combustor is approximately 8.5 lbs./lb. natural gas. A steam injected gas turbine cycle with a turbine inlet temperature of 1600° F. would have a net electrical efficiency of about 37% (on a HHV basis). If a 2000° F. turbine inlet temperature is utilized, no tertiary air is required in exhaust chamber 70. Such a system would achieve an efficiency of about 40%.

A second embodiment of the combustion apparatus of the present invention will now be described with reference to FIG. 6. As can be seen in FIG. 6, the combustion apparatus of the second embodiment includes elongated combustion vessel 102 having first combustion portion 14 and second combustion portion 16 for sub-stoichiometric combustion and above-stoichiometric combustion, respectively. Preferably, the second embodiment also includes exhaust chamber 70.

In accordance with the second embodiment of the present invention, the combustion apparatus includes refractory lined fuel plenum chamber 100 disposed concentrically to elongated combustion vessel 102. Fuel plenum chamber 100 includes a fuel inlet 104 through which combustible gases (coal gaseous fuel) is supplied at a temperature of about 1600° F. A refractory swirler 40' is disposed between fuel plenum chamber 100 and first combustion portion 14 for directing the combustible gases into first combustion portion 14 in a direction substantially tangential to the cylindrical wall of first combustion portion 14. Gas swirler 40' is of the same construction described earlier for gas swirler 40.

In accordance with the second embodiment of the present invention, a primary plenum chamber 110 tangentially supplies air from a compressor (not shown) into first combustion portion 14 through primary air nozzles 112 for sub-stoichiometric combustion. The primary air mixes with the gasified coal supplied through swirler 40' to create swirling combustion in first combustion portion 14. Steam can also be supplied into first combustion portion 14 via air plenum chamber 110 for reducing the concentration of $NO_x$ formed in first combustion portion 14.

In accordance with the second embodiment of the present invention, vitiated air from the hot gas clean-up section of the combined cycle can be added to both first combustion portion 14 and second combustion portion 16 through refractory lined ducts 114 and 116, respectively. Preferably, the combustion temperature in first combustion portion 14 and second combustion portion 16 of the second embodiment should be maintained at less than about 2000° F. and the combustion temperature in exhaust chamber 70 should be maintained at a temperature which the gas turbine is designed for.

The gas turbine combustor of the present application can be coupled with an aircraft-derived gas turbine engine and a compressor for industrial range power plants (<5 Mw). The gas turbine combustor of the present application can also be coupled with a utility size gas turbine engine for power plant applications. The external gas turbine combustor will yield $NO_x$ emissions (<1 ppm at x 15% $O_2$) and CO emissions (virtually zero) at such a low level that costly catalytic reduction units will not be required, even at locations with the most stringent emissions standards. Also the gas turbine combustion of the present application is simple and inexpensive to manufacture because it is fabricated from castable refractory and carbon steel. Moreover, since it is refractory-lined, the combustor will be corrosion-resistant with an extended lifetime. The refractory lining also provides a source of ignition for low BTU gas at reduced gas throughputs and will provide stable combustion for gases with reduced heating value during upstream process upsets.

It will be apparent to those skilled in the art that various modifications and variations can be made in the combustion apparatus and method of the present invention. The invention in its broader aspects is, therefore, not limited to the specific details, representative apparatus, and illustrative examples shown and described above. Thus, it is intended that all matter contained in the foregoing description or shown in the accompanying drawings shall be interpreted as illustrative rather than limiting.

What is claimed is:

1. A method of combustion for a gas turbine to minimize $NO_x$ and CO emissions, the method comprising the steps of:
   tangentially supplying a first stream of pressurized air along a wall of combustion vessel into a first portion thereof in an amount sufficient for sub-stoichiometric combustion of fuel therein;
   supplying fuel in the first portion of the combustion vessel in a fuel-rich ratio;
   transporting resulting sub-stoichiometric combustion product gases from the first portion of the combustion vessel to a second portion of the combustion vessel, the first and second portions of the combustion vessel being separated by a gas swirler for increasing the swirling intensity of the gases entering the second portion;
   tangentially supplying a second stream of pressurized air along the wall of the combustion vessel into the second portion in an amount sufficient for above-stoichiometric combustion of the gases entering the second portion;
   creating a cyclonic flow pattern of hot gases within one of the first and second portions of the combustion vessel and creating a swirling pattern of combustion along the wall of the combustion vessel in the other of the first and second portions;
   supplying pressurized steam into the combustion vessel to minimize $NO_x$ emissions; and
   transporting resulting above-stoichiometric combustion product gases out of the second portion of the combustion vessel to a gas turbine.

2. The method of claim 1, further comprising the step of transporting the above-stoichiometric combustion product gases from the second portion of the combustion vessel into an exhaust chamber wherein the gases undergo a reduction in temperature prior to entering the gas turbine.

3. The method of claim 2, further comprising the step of supplying a third stream of pressurized air into the exhaust chamber to reduce the temperature of the above-stoichiometric combustion product gases.

4. The method of claim 1, wherein the cyclonic flow pattern is created in the second portion of the combustion vessel by providing an exit throat at a rear end of the second portion, the exit throat having a diameter less than the inside diameter of the wall of the combustion vessel at the second portion.

5. The method of claim 1, wherein a pressure in the range of about 4 atmospheres to about 25 atmospheres is maintained in the combustion vessel.

6. The method of claim 1, wherein the first stream of pressurized air supplied to the first portion of the combustion vessel is about 40% to about 70% of the amount required for stoichiometric combustion therein.

7. The method of claim 1, wherein the fuel is supplied to the first portion of the combustion vessel through a fuel plenum chamber and the first stream of pressurized air is supplied through an annular air space disposed concentrically within the combustion vessel and surrounding the fuel plenum chamber.

8. The method of claim 7, wherein the annular air space includes a plurality of radially spaced vanes and the fuel is supplied into the annular air space through a plurality of radially spaced gas distribution holes disposed between adjacent vanes.

9. The method of claim 1, wherein the second stream of air is supplied tangentially along the wall of the combustion vessel through a plurality of radially spaced air nozzles, the air nozzles being positioned adjacent the gas swirler.

10. The method of claim 1, wherein the combustion temperature in the first portion of the combustion vessel is maintained in the range of about 1400° F. to about 2000° F.

11. A combustion apparatus for a gas turbine to minimize the formation of $NO_x$ and CO, the apparatus comprising:
   an elongated combustion vessel having a longitudinal axis and a front end, the combustion vessel including a first combustion portion and second combustion portion along the longitudinal axis for sub-stoichiometric and above-stoichiometric combustion, respectively, the first combustion portion being in communication with the second combustion portion, the first and second combustion portions of the combustion vessel being separated by a gas swirler, and the combustion vessel further including a substantially cylindrical wall;
   means for supplying fuel into the first portion of the combustion vessel;
   means for tangentially supplying a first stream of pressurized air along the wall of the combustion vessel into the first portion of the combustion vessel in an amount sufficient to form a fuel-rich ratio for sub-stoichiometric combustion within the first portion of the combustion vessel;

means for tangentially supplying a second stream of pressurized air along the wall of the combustion vessel into the second portion of the combustion vessel to mix with sub-stoichiometric combustion product gases for above-stoichiometric combustion in the second combustion portion;

means for forming a cyclonic flow pattern of combustion within one of the first and second combustion portions of the combustion vessel;

means for forming a swirling pattern of combustion along the wall of the combustion vessel in the other of the first and second combustion portions of the combustion vessel; and means for supplying pressurized steam into the combustion vessel to reduce the formation of $NO_x$.

12. The combustion apparatus of claim 11, wherein the wall of the combustion vessel is lined with refractory material.

13. The combustion apparatus of claim 12, wherein the means for supplying pressurized steam and the means for supplying the first and second streams of pressurized air maintain the combustion temperature in the combustion vessel at less than about 2000° F. throughout combustion operation.

14. The combustion apparatus of claim 12, further comprising an exhaust chamber extending rearwardly of the second portion of the combustion vessel for cooling exhaust gases exiting from the second portion.

15. The combustion apparatus of claim 14, further comprising means for supplying a third stream of air into the exhaust chamber to lower the temperature of the exhaust gases.

16. The combustion apparatus of claim 12, wherein the means for supplying fuel includes a fuel plenum chamber having an outer surface, a fuel inlet, and a plurality of radially spaced gas distribution holes, and further wherein an annular air space is formed between the fuel plenum chamber outer surface and the refractory material lining the wall of the combustion vessel, said gas distribution holes supplying fuel into the annular air space.

17. The combustion apparatus of claim 16, wherein the annular air space includes a plurality of spaced radial vanes tilted at a selected angel from the longitudinal axis of the combustion apparatus and the means for supplying the first stream of pressurized air includes a plenum chamber at the front end of the combustion vessel having an air inlet and an opening in communication with the annular air space for supplying the first stream of pressurized air into said annular air space to mix with the fuel.

18. The combustion apparatus of claim 12, wherein the means for supplying fuel includes a fuel oil inlet pipe for supplying fuel into a front end of the first portion of the combustion vessel.

19. The apparatus of claim 17, wherein the gas distribution holes are disposed between adjacent radially spaced vanes in the annular air space.

20. The combustion apparatus of claim 19, wherein the first combustion portion includes a rear end and further wherein the gas swirler is disposed at the rear end of the first combustion portion for directing swirling hot combustion gases out of the first combustion portion in a direction substantially tangential to the cylindrical wall of the combustion vessel.

21. The combustion apparatus of claim 20, further comprising a substantially cylindrical exit throat disposed at a rear end of the second portion of the combustion vessel, the exit throat having a diameter less than the diameter of the cylindrical wall of the combustion vessel.

22. The combustion apparatus of claim 21, wherein the means for supplying the second stream of pressurized air, the gas swirler, and the exit throat are dimensioned and configured to effect cyclonic combustion in the second combustion portion with a Swirl number of a least 0.6 and a Reynolds number of at least 18,000.

* * * * *